May 26, 1936. B. SASSEN Re. 19,985
PATTERN CONTROLLED DIE SINKING MACHINE
Original Filed June 20, 1932 4 Sheets-Sheet 1
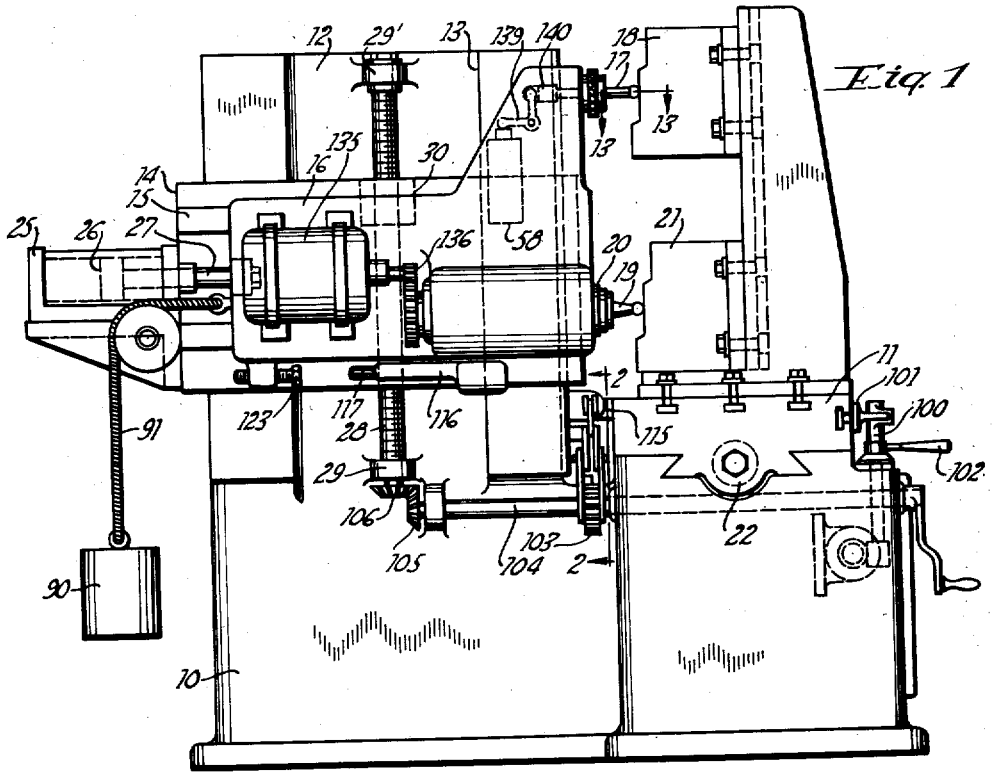
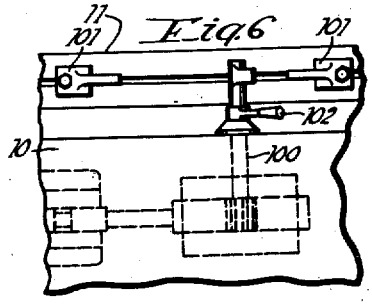
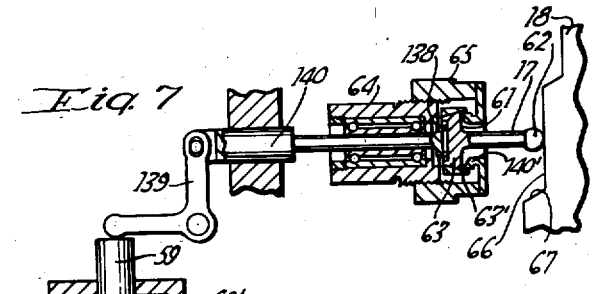
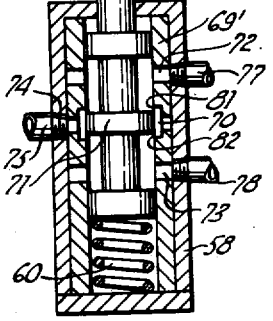
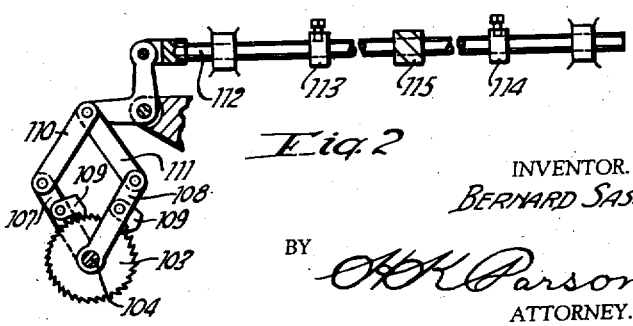
INVENTOR.
BERNARD SASSEN
BY A. K. Parsons
ATTORNEY.

May 26, 1936. B. SASSEN Re. 19,985
PATTERN CONTROLLED DIE SINKING MACHINE
Original Filed June 20, 1932 4 Sheets-Sheet 2
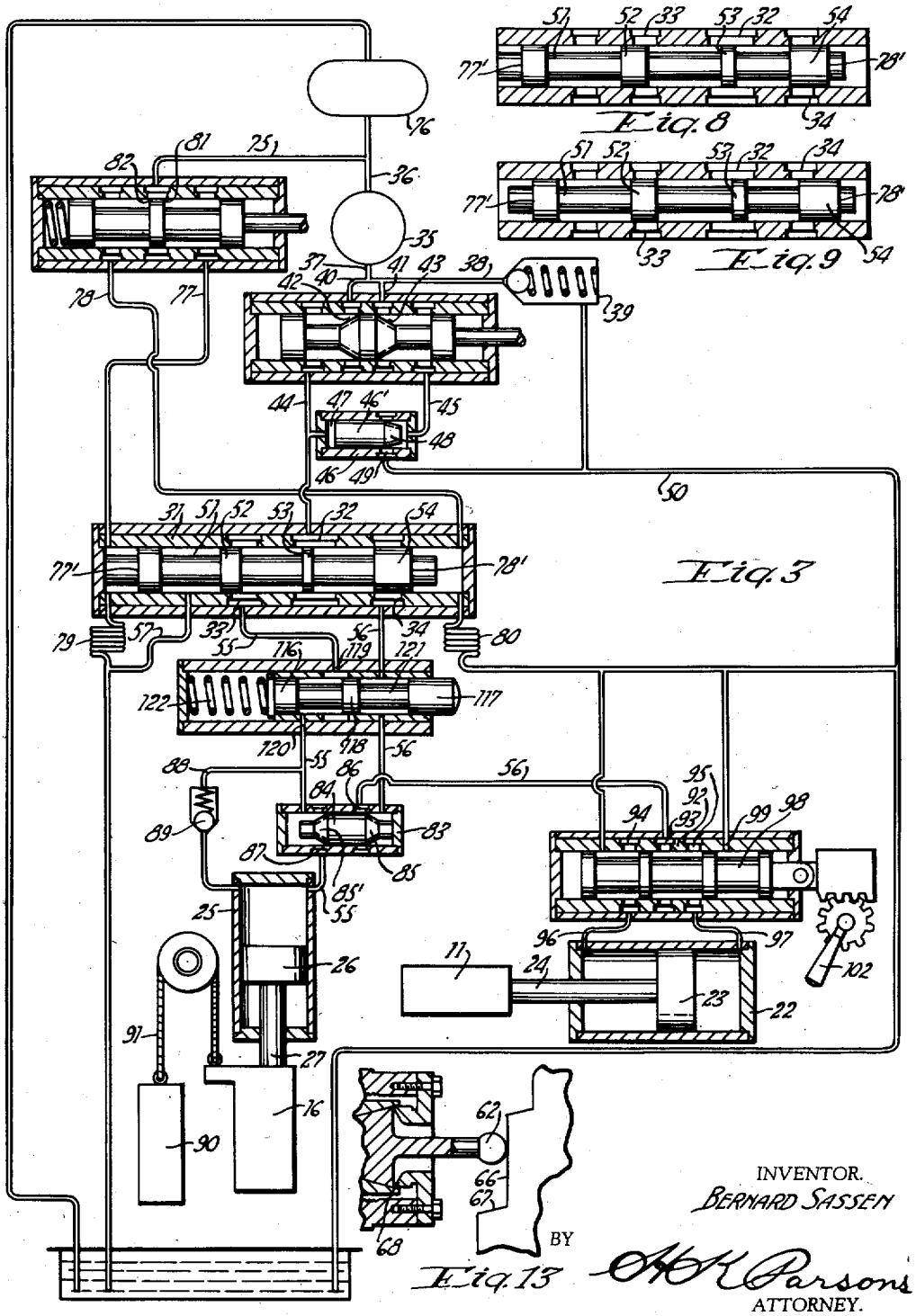
INVENTOR.
BERNARD SASSEN
BY
A. H. Parsons
ATTORNEY.

May 26, 1936. B. SASSEN Re. 19,985
PATTERN CONTROLLED DIE SINKING MACHINE
Original Filed June 20, 1932 4 Sheets-Sheet 3
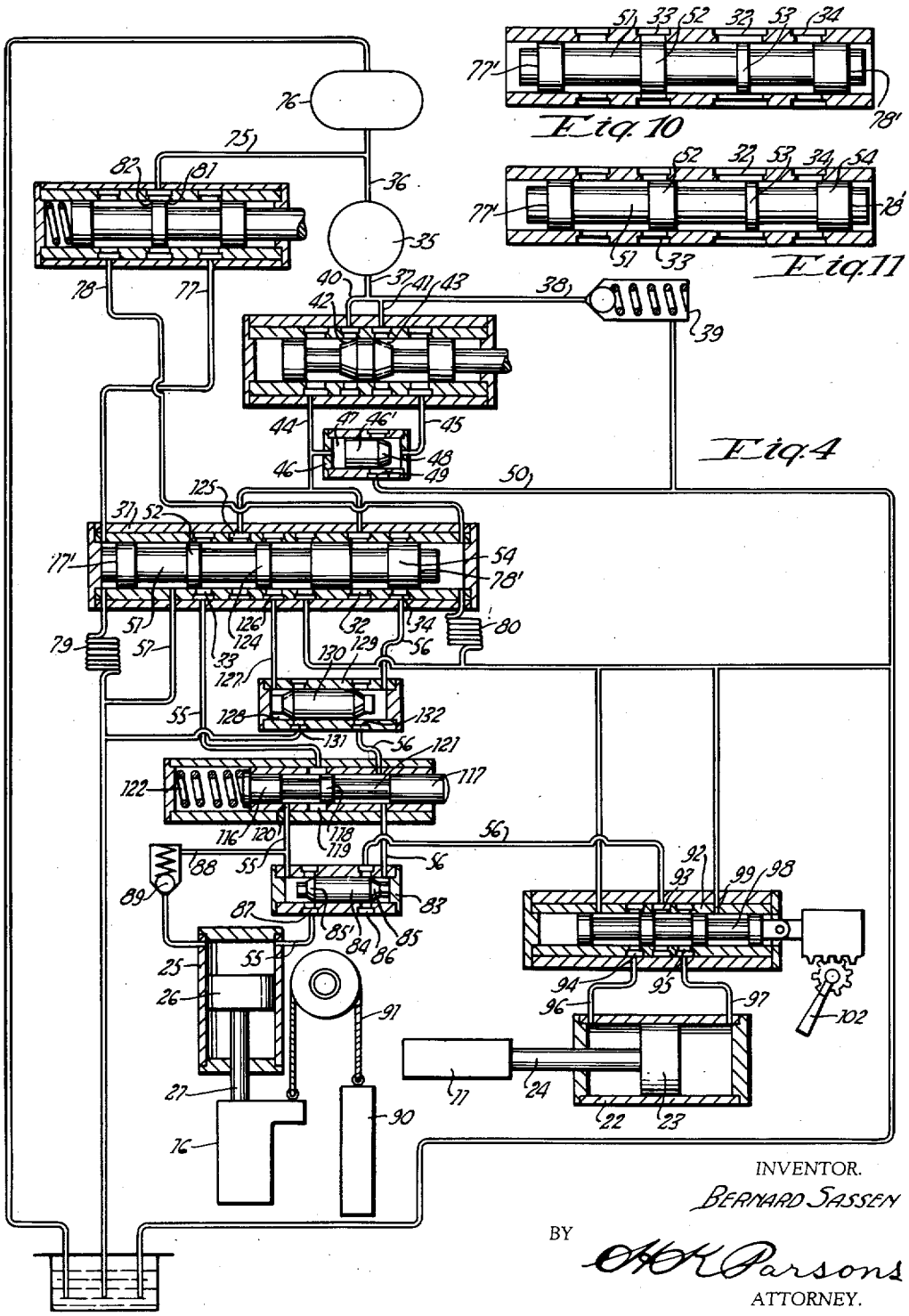
INVENTOR.
BERNARD SASSEN
BY
H. K. Parsons
ATTORNEY.

May 26, 1936. B. SASSEN Re. 19,985

PATTERN CONTROLLED DIE SINKING MACHINE

Original Filed June 20, 1932 4 Sheets-Sheet 4

INVENTOR.
BERNARD SASSEN
BY
O. K. Parsons
ATTORNEY.

Reissued May 26, 1936 Re. 19,985

UNITED STATES PATENT OFFICE 19,985

PATTERN CONTROLLED DIE-SINKING MACHINE

Bernard Sassen, Cincinnati, Ohio, assignor to The Cincinnati Milling Machine Company, Cincinnati, Ohio, a corporation of Ohio Original No. 2,024,256, dated December 17, 1935, Serial No. 618,111, June 20, 1932. Application for reissue March 26, 1936, Serial No. 71,074

44 Claims. (Cl. 90—13.5)

This invention relates to milling machines and more particularly to pattern controlled die-sinking machines.

One of the objects of this invention is to provide an improved die-sinking machine for cutting steel dies and the like from patterns made of relatively soft non-metallic materials such as plaster-of-Paris or the like wherein hydraulic means are utilized as the power medium for relatively positioning the cutter with respect to the work in accordance with the movement of a pattern controlled tracer.

Another object of this invention is to provide an improved tracer controlled hydraulic circuit for causing relative movement between a tool and work in accordance with the movement imparted to a tracer by a pattern during scanning thereof whereby the contour of the pattern will be duplicated in the work piece.

A further object of this invention is to provide an hydraulically operated die-sinking machine having more sensitive means for detecting reversals in tracer deflection as caused by the pattern and transmitting the same to the operating slides whereby the direction of relative cutter movement will be changed more accurately and expeditiously in accordance with the tracer deflection than now possible in present machines resulting in a more faithful reproduction of the pattern.

Additional objects of this invention are to provide an hydraulically operated die-sinking machine which is composed of a relatively few parts; which is completely automatic in operation; which may be adjustable during operation to vary the feed rate; and which is provided with auxiliary control means whereby an exceptionally deep die may be formed by successive cuts with the use of only a single pattern.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 1 is an elevational view of a machine embodying the principles of this invention.

Figure 2 is a detailed view as viewed on the line 2—2 of Figure 1.

Figure 3 is a diagram of the hydraulic circuit utilized in the machine.

Figure 4 is a diagram similar to Figure 3 using a modified form of distributor valve.

Figure 6 is a detail view showing the trip control mechanism for the table reversing valve.

Figure 7 is a sectional view of the tracer control mechanism.

Figures 5, 12:
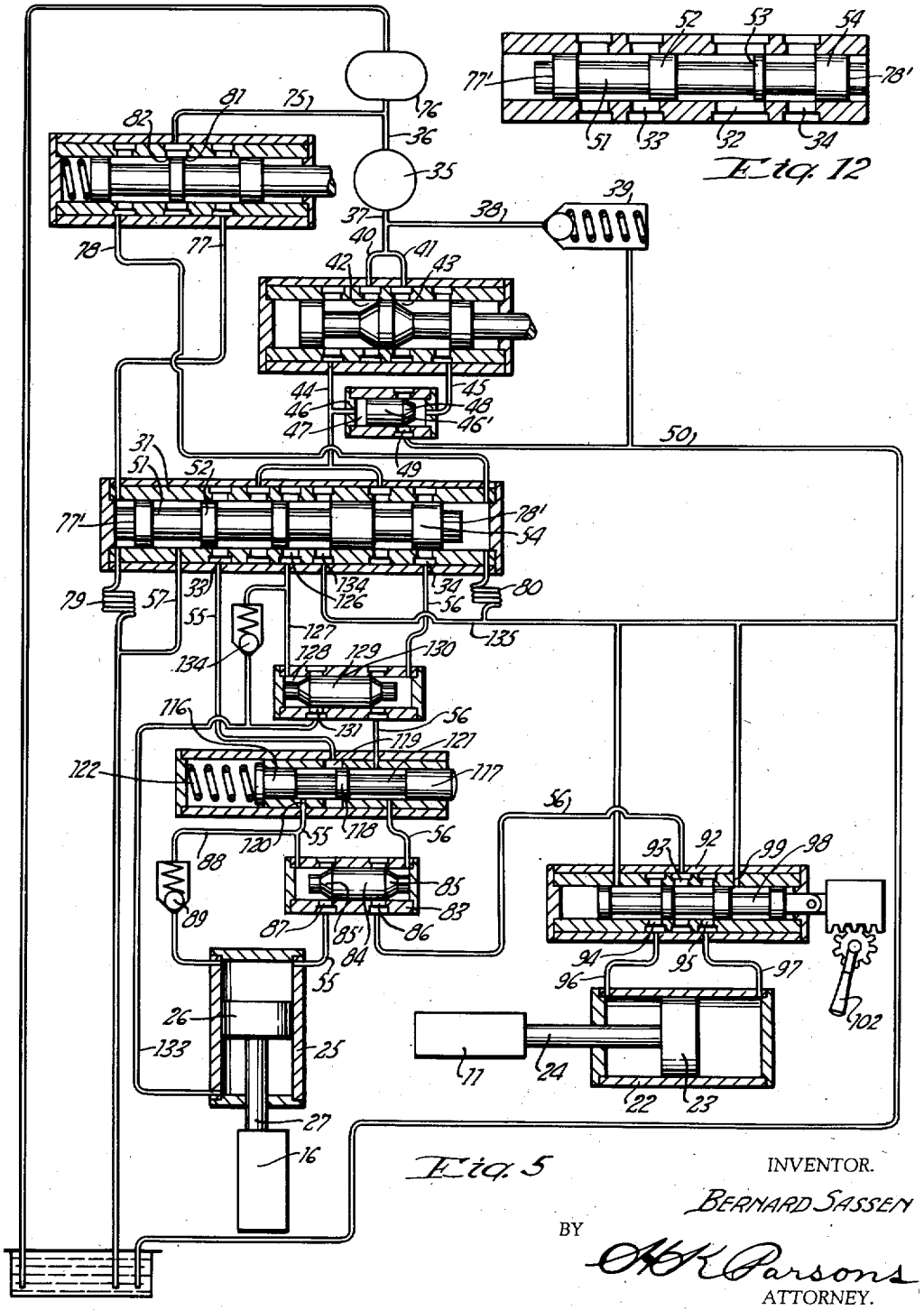
Figure 5 is a view showing a modified form of hydraulic circuit.

Figures 8 to 12 inclusive show successive positions of the distributor valve during one stroke thereof.

Figure 13 is a detail section on line 13—13 of Figure 1.

Pattern controlled die-sinking machines are usually provided with a tracer and a cutter for contacting respectively with a pattern and a work piece. In order to effect die-sinking operations it is necessary to provide relative movement between the tracer and pattern as well as between the tool and work in three different directions or planes. For the purposes of illustration, these will be termed herein as traversing; infeeding or outfeeding; and cross-feeding or indexing. To accomplish these relative movements it is necessary that a structure be provided whereby the various parts may be supported in such relation to one another that this is possible. It is obvious that this may be accomplished in various manners, such as mounting the tracer mechanism and cutter on a fixed support and effecting relative movement of the work in three directions to the fixed support or vice versa; or part of the movements may be imparted to one member, and the remaining movements imparted to the other.

One of these latter combinations has been chosen for illustrative purposes herein and in the present structure the tracer and cutter are mounted for movement in two directions, while the work is mounted for movement in one direction. To this end a support 10 is provided as shown in Figure 1, having a work support or table 11 mounted on the bed for what will be termed herein as the traversing movement. A column 12 extends upward from the bed 10 adjacent to the table 11 and is provided with guideways 13 upon which is reciprocably mounted a carriage 14 for what will be termed herein as the cross-feed or indexing movement. The carriage 14 is provided with horizontal guideways 15 upon which is mounted a spindle carrier 16 for what will be termed the in-feed and out-feed movement. The carrier 16 also has mounted thereon the tracer controlled mechanism including a tracer member 17 adapted to cooperate with a pattern 18 carried by the table, this mechanism in turn directing the relative movement between a cutter 19 mounted on spindle 20 and a work piece 21 mounted on the table. An electric motor 135 is mounted on the carrier for effecting rotation of the spindle by suitable means, such as gearing 136.

An hydraulic motor comprising a cylinder 22, having contained piston 23, is utilized for traversing the work table 11, the piston being operatively connected to the table by the piston rod 24. A second hydraulic motor comprising a cylinder 25, having a contained piston 26, is utilized for effecting infeed of the carrier, the piston being operatively connected to the carriers by a piston rod 27. A lead screw 28 is journaled at opposite ends in bearings 29 and 29′ carried by the column for operative engagement with a nut 30 fixed to the carriage whereby rotation of the lead screw will effect cross feed of the carriage constituting the third direction of relative movement between the cutter and work. From this structure it will be seen that one directional movement is imparted to the work and pattern while the remaining directional movements are imparted to the cutter and tracer.

The method of die-sinking herein utilized consists of traversing the work and pattern relative to the tracer and cutter for the full length of the stroke during which time, movement of the tracer by the pattern will cause the cutter to infeed or outfeed in accordance with variations in the contour of the pattern. Each reversal in tracer deflection, causes first a deceleration of cutter slide movement and a starting and acceleration of the work support. This deceleration continues until the cutter slide movement has momentarily stopped at which time the work support traverses at constant full speed. This is followed by a deceleration and stop of the work support accompanied by the acceleration in the opposite direction of the cutter slide. At the completion of the stroke the traversing movement is reversed, and an incremental cross-feed or indexing may be imparted to the carriage 14 to position the work for a second cut during the return stroke of the table.

It is well known in die-sinking operations that a constant traversing speed cannot be imparted to the work with any degree of success especially where the pattern may have steep walls due to the fact that movement of the table must be retarded to permit sufficient time for the cutter to do its work in sinking into or being withdrawn relative to the work. It is therefore necessary to coordinate the movements in the two directions which lie in a horizontal plane in the present instance and at right angles to one another, that is, the traversing movement of the work and the infeeding movement of the cutter and tracer, so that larger or smaller infeed or outfeed movements may be effected for each increment of traverse with the result that a more uniform cutting action is obtained. In accordance with the foregoing, mechanism has been provided under the control of the tracer for variously proportioning or distributing the flow of an hydraulic medium to the table and spindle carrier operating cylinders or motors so that these results may be obtained.

Since the contour lines of the pattern are usually irregular, it follows that the resultant movement of the tracer with respect to the pattern may be at various angles; or in other words, in a path other than the path of movement of either the work support or cutter support, and in a path which is the resultant of movement in these two paths at various velocities dependent upon the angle of the movement. In the present instance these movements are not obtained by effecting continuous simultaneous movement of the two supports at varying velocities but rather by imparting small incremental movements to the two supports, the relative lengths and rates of these movements determining the resultant angular movement. Thus, if these increments are such as to produce equal effective velocities in the two supports, it is apparent that the resultant displacement would be in a direction at 45 degrees to the path of movement of the work table and carrier, while an increase or decrease in the effective movement of one slide with respect to the effective movement of the other slide would cause a deviation from this mid-line.

It accordingly is necessary to divide or distribute the hydraulic flow for these cylinders so that each may be moved in some predetermined relation to the movement of the tracer and to this end a distributing valve indicated generally by the reference numeral 31 is provided, having an inlet port 32 and distributing ports 33 and 34. Fluid under pressure is supplied to the distributing valve from a pump 35 which may be of the constant displacement type and which is constantly driven by a suitable prime mover not shown, during operation of the machine. The pump is provided with an intake 36 and an output line 37 having a branch line 38 in which is mounted a relief valve 39 which may discharge to reservoir.

A feed rate control mechanism is inserted between the pump 35 and the distributor valve 31 for varying the feed rate of the machine. Since the feed rate can only be varied by reducing the volume of fluid delivered to the actuating cylinders, means have been provided for diverting a portion of the fluid to reservoir in accordance with the feed rate desired. To this end the flow from channel 37 is divided into two branch lines 40 and 41 each of which is connected by variable fluid resistances 42 and 43 to channels 44 and 45. Since the volume in the channel 37 is constant so long as the relief valve remains closed, it is apparent that the total volumetric discharge of the pump must flow through the lines 44 and 45 and the pressure in line 37 as well as 40 and 41 must be equal because different pressures cannot exist in the same body of fluid at the same time. It will thus be apparent that if the fluid resistances 42 and 43 are equal, and the pressure in lines 40 and 41 are equal that equal amounts of fluid will be forced through the fluid resistances 42 and 43; while if these resistances are varied, the proportion passing through the branch lines will vary inversely as the resistances, that is, an increase in one fluid resistance will cause a decrease in the other and the flows will always be complemental to one another. That is in accordance with the theory explained in copending application of Ernst, et al., Serial Number 490,154, filed October 21, 1930, and further explanation thereof is not believed to be necessary here. As there explained a balancing valve 46 is provided for maintaining the proportions of flow established by the fluid resistances. One end 47 of the balancing valve is connected to channel 44 while the opposite end 48 is connected to channel 45. The end 48 of the valve plunger 46′ may be tapered to partially close or throttle the port 49 formed in the valve body. A channel 50 is connected to port 49 to conduct the diverted portion of the flow to reservoir. This mechanism thus serves to effect a division of flow between channels 44 and 45 as established by the setting of the fluid resistances 42 and 43 and thus the feed rate may be determined by the proportion of the main flow delivered to the channel 44. The function of the balancing valve is to maintain this division irrespective of variations in work resistance.

The distributing valve has a reciprocable plunger 51 mounted therein which is provided with three spools 52, 53 and 54 these spools determining to which of the motor channels 55 and 56 the fluid from channel 44 is to be distributed. When the valve plunger 51 is in a left hand position as shown in Figures 3 and 8, the spool 54 is in a position to close the port 34. The spool 53 is sufficiently narrow in width to permit relatively free flow of the pressure from port 32 to the port 33 which is now uncovered by the spool 52. This position will cause 100% infeed of the cutter slide and no movement of the work slide. Assume now that the total movement or stroke of the plunger is equal to the distance S. If the plunger 51 moves toward the right it will effect, after traveling a distance equal to ¼ S, a partial opening of the port 34 and a partial closing of the port 33 as shown in Figure 9 in which position, the incoming flow through port 32 will be evenly distributed to ports 33 and 34 and the two slides will be moving at substantially equal rates. It will be apparent that this condition has been brought about by a deceleration in the rate of cutter slide movement and a starting and acceleration of the work slide.

After continued movement of the valve through another distance equal to one-quarter of S, the valve will reach a position such as shown in Figure 10. In this view it will be seen that the port 33 is closed thus stopping the cutter slide; and that the spools 53 and 54 are in such position that the ports 32 and 34 are open an equal amount, this position thus being the only one which permits a maximum flow to the table slide cylinder. This will be evident from examination of Figure 10 for movement of the plunger in either direction from this position will cause either spool 54 or spool 53 to close its respective port.

Thus the plunger in moving from the position shown in Figure 9 to the position shown in Figure 10, caused deceleration of the cutter slide and acceleration of the table slide until at the position shown in Figure 10, it stopped the cutter slide and caused movement of the table at its maximum rate.

Further movement of the plunger through another distance equal to one quarter S will bring it to the position shown in Figure 11. Here the port 33 is partially open to exhaust and the spool 53 has partially restricted the flow to port 34. The movement of plunger 51 through this distance thus decelerates the movement of the work slide and opens the cutter slide cylinder to exhaust permitting the same to be accelerated in the opposite direction, that is an outfeed movement.

A final movement of the valve to the position shown in Figure 12, stops the movement of the table slide and permits outfeed of the cutter slide at its full rate.

In order to variously position the valve plunger 51 to effect reproduction of any desired pattern, a tracer controlled mechanism is provided terminating in a tracer which contacts the pattern. This tracer mechanism includes a primary valve indicated generally by the reference numeral 58 having a plunger 59 reciprocably mounted therein and a spring 60 interposed between the end of the plunger and the end of the valve body for exerting an outward pressure on the plunger. A bell crank 139 operatively connects the plunger to the reciprocable bar 140 antifrictionally mounted in housing 64. The opposite end of the bar is provided with a cup-shaped disk 138 engaging the rear face of circular head 63 from the center of which projects a tracer arm 17, the free end of which is provided with a ball-shaped tracer point 62 for engaging the pattern 18. The bar 140 is mounted in a housing 64 and capable of axial movement relative thereto. The front face 61 of the head 63 has a conical diverging flange 63′ projecting therefrom, the intersection of the face and flange forming an angle, in the corner of which is received the annular V-shaped edge 140′ of flange 65′ integral with housing 65. When the tracer button 62 is free of the pattern, the spring 60 maintains the disk 138 in contact with member 63 and presses or seats this member onto the V-shaped edge 140′ which supports and centralizes the member 63 relative to the flange 65′ thus holding the arm 17 horizontal. When the tracer comes in contact with a surface such as 66 of the pattern, Figure 13, the tracer arm will be moved axially thereby effecting movement of the valve plunger against the compression of spring 60. Likewise if the tracer button engages an inclined surface 67 of the pattern, the arm will be angularly deflected causing the head 63 to be pivoted about a point, such as 68, which in turn will also cause axial movement of the plunger 69 against the compression of spring 60.

The valve 58 is provided with a sleeve 69′ in which is formed an annular groove 70, this groove being slightly wider than the spool 71 formed in the valve plunger so that when the spool is in a central position a very high resistance will be presented to the flow of fluid on either side thereof. The smaller this clearance space is, the higher will be the fluid resistance and thus the more sensitive the valve will be. Additional ports 72 and 73 are also formed in the valve on opposite sides of the central port 74, the latter port being connected by channel 75 to a pump 76 which may be of the constant displacement type, and the ports 72 and 73 being connected respectively by channels 77 and 78 to opposite ends of the distributor valve 31 for subjecting piston portions 77′ and 78′ upon opposite ends of plunger 51 to pressure. Two fixed fluid resistances 79 and 80 which may consist of equal lengths of small bore tubing are also connected to the opposite ends of the distributor valve to conduct the fluid therefrom to reservoir, the fluid resistances acting to maintain pressures in the channels 77 and 78 to effect rapid shifting of the distributor valve as hereinafter described. The operation of the tracer mechanism is as follows:

The flange member 65 is threaded on the housing 64 so as to effect longitudinal positioning of the spool 71 relative to the port 70 when the tracer point is free of contact with the master. In normal operation, when the tracer is contacting the pattern, the spool 71 will be substantially midway of the annular groove 70 thereby permitting a passage of oil on each side thereof through ports 72 and 73. The clearance spaces 81 and 82 which permit this passage of oil constitute variable fluid resistances which incidentally cause a high pressure to be built up in the line 75 due to the fact that the entire discharge from pump 76 is normally compelled to pass through them. These clearance spaces are made small, that is, of the order of a few thousandths of an inch so that it will only take a small tracer movement to vary their value. But it is also desirable that this small movement of the tracer will effect the comparatively large movement of the distributor valve. In order to effect this large movement, there must be sufficient volume available in a short space of time to effect the displacement of the piston portions of the distributor valve. The shorter the space of shifting time, the larger the volume that must be available. Therefore by providing a pump having suitable volumetric delivery to effect the movement in the desired period of time, and fluid resistances of such construction that slight movement of the tracer will effect large variations in the valve thereof, it is possible to amplify the small movement of the tracer into a large and relatively fast movement of the distributor valve.

The manner of effecting the pressure differential in opposite ends of the distributor valve is as follows. If it were possible to maintain the spool 71 exactly in the center of groove 70, the resistances 81 and 82 would obviously be equal. If then the fixed resistances 79 and 80 are also made equal to each other, it will still be obvious that the flow from channel 75 will be equally divided between lines 77 and 78, and thus the pressures acting on the piston areas 77′ and 78′ will be equal. Now if the valve spool 71 is moved the slightest amount off center the resistances 81 and 82 will no longer be equal, thus causing an unequal division of flow between the lines 77 and 78, and consequently unequal pressures on the piston areas 77′ and 78′. For instance, if the spool 71 is moved slightly above the central position, shown in Figure 7, the fluid resistance 81 will be greater than the resistance 82, and therefore the quantity flowing in line 78 will be greater than that in line 77 and the pressure acting on piston area 78′ will be greater than that acting on piston area 77′, thus moving the valve to the position shown in Figure 3. Conversely, if the spool 71 is moved slightly below the center position, the resistance 82 will be greater than the resistance 81, causing a greater flow in line 77 than 78 and a greater pressure on piston area 77′ than on piston area 78′, shifting the valve to the position shown in Figure 12.

From the previous description of the distributor valve it will be noted that the extreme positions thereof will cause movement of the cutter slide in either one direction or the other, and therefore the tracer will be constantly oscillated to cause constant relative variation of these resistances. When the tracer is free of the pattern the spool 71 should be positioned above the center of the annular groove 70 so that the pressure on the piston portion 78′ of the distributor valve will be larger than that on the other end and thus the distributor valve will be in a position to cause an infeed of the carrier and produce contact of the tracer with the pattern. If this condition exists it will then be apparent that a slight axial movement of the tracer arm or a lateral deflection thereof as it contacts the pattern will cause longitudinal movement of the primary valve downward as viewed in Figure 7, and a shifting of the distributor valve to the right or to the position shown in Figure 12 thereby cutting off the infeed and causing an incremental longitudinal movement of the work table. This will cause a new portion of the pattern to be positioned beneath the tracer button and if this portion lies in the same plane such as 66, Figure 13, as the preceding portion; or in a plane to the left thereof such as 67 causing further deflection of the tracer, the cutter carrier will outfeed until the tracer deflection is reduced to that predetermined minimum which will cause shifting of the distributor valve while if the new portion is in a plane to the right the tracer deflection will be immediately reduced to its predetermined minimum causing a shift of the distributor valve which in turn will cause the carrier to infeed until a maximum deflection once more causes a reversal of the distributor valve. In the first instance, the distributor valve will not be shifted thereby permitting the outfeed movement to continue whereas in the second instance, the distributor valve will be shifted causing infeeding of the cutter. This subsequent shift of the distributor valve will cause another feed movement of the work. From this it will be seen that for every shift of the distributor valve, the table is given an increment of feed. As a practical matter all of these various shifting movements take place at a high speed as the actual movements are of the order a few thousandths of an inch. The pump 76 which supplies pressure to the tracer valve control mechanism may be of such capacity that it may also be utilized to super-charge the pump 35.

A balancing valve 83 is interposed in the motor channels 55 and 56 for the purpose of maintaining the division of flow between lines 55 and 56 as established by the proportion of the resistances of the ports 33 and 34 irrespective of the work resistances of motors 22 and 25 and in accordance with the theory explained in copending application of Hans Ernst, Serial Number 614,980 filed June 2, 1930. This valve has a reciprocable plunger 84 with tapered ends 85 and 85′, which is normally positioned in its extreme right hand position. In this position it closes the port 86 and opens the port 87. As soon as pressure fluid is delivered to the channel 56 through port 34 the pressure in the right hand end of the valve 83 will cause shifting of the plunger 84 to the left which will in turn close the port 87 and open port 86 thereby permitting a full flow to the table cylinder. While in this position, the plunger 51 of the distributor valve will have completed its movement, thereby connecting the motor channel 55 to return line 57 causing a drop in pressure in the short circuiting line 88 which in turn will permit the pressure in cylinder 25 to force open the check valve 89 and permit discharge of fluid therefrom under the action of a constant pressure medium such as a weight 90 causing outfeed of the carrier. This weight is connected by a chain 91 to the slide 27 and exerts a constant thrust on the slide in an outward direction so that the fluid in the cylinder will always be under pressure. A spring or a constant hydraulic pressure may be utilized in place of the weight with equal effect.

At the completion of one stroke of the work table, means have been provided for automatically reversing its direction of movement. This mechanism includes a reverse valve 92 which is inserted between the terminus of channel 56 and the cylinder 22. This valve has a pressure port 93 to which channel 56 is connected, and additional ports 94 and 95 which are connected respectively to channels 96 and 97 leading to opposite ends of cylinder 22. When the plunger 98 of the valve is in the position shown in Figure 3 fluid pressure will be delivered to the right hand end of cylinder 22 and the work table will feed toward the left. On reversal of the plunger, the port 93 will be connected with port 94; and port 95 will be connected to the exhaust port 99 thereby admitting pressure to one end of the cylinder and permitting the fluid in the other end to be discharged to reservoir. A plunger 100 is rotatably mounted adjacent the side of the work table and operatively connected with the valve through a suitable load and fire mechanism for effecting shifting thereof, that shown in Figure 12 of copending application of Walter Archea, Serial Number 364,369, filed May 20, 1929, being suitable for present purpose. The table has a T-slot in the front edge thereof in which dogs 101 may be suitably spaced in accordance with the length of the work for effecting automatic shifting of the valve at each end of the table stroke. A manual control lever 102 may also be provided for effecting manual operation of the reversing valve.

In addition to reversing the direction of movement of the work table at the end of each cutting stroke, means have also been provided for indexing the cutter supporting carriage so that upon a subsequent stroke of the table a new portion of the pattern will pass beneath the tracer and another cut may be effected upon the work. This means comprises a ratchet wheel 103 which is fixed to the end of the carriage lead screw 28. A ratchet mechanism is provided for imparting an increment of feed to the lead screw at the end of each stroke of the table. To this end a double toggle mechanism is provided as shown in Figure 2, comprising links 107 and 109 mounted for free rotation on the shaft 104 each link carrying a pawl 109 held in engagement with the ratchet wheel by means of springs not shown. Additional links 110 and 111 are connected to the ends of the links 107 and 108 and jointly connected at the other end to a bell crank which in turn is connected to the shifter rod 112 which carries adjustable dogs 113 and 114 for actuation by a fixed dog 115 carried by the table. It will thus be seen that at the end of each stroke of the table that the reversing valve is automatically shifted and that the tool carriage is given a small lateral or cross feed movement. By changing the position of the dogs 113 and 114 so as to contact dog 115 at different times relative to the time of shifting of the reverse valve, the amount of feed may be varied.

In cutting deep dies, it is impossible for the cutting tool to be sunk to the required depth and thus remove all of the material of a die cavity during a single tracing operation, and it therefore becomes necessary to remove the material from the cavity in layers. In such a case a number of patterns of different depth would be necessary depending upon the number of layers into which the material is sub-divided. To obviate the necessity for this, means have been provided comprising a depth limit valve, indicated generally by the reference numeral 116, for effecting removal of the material in layers without the use of a plurality of patterns. This valve, as shown in Figure 3, comprises a plunger 117 having a spool portion 118 which in the outward position of the valve connects port 119 with port 120 permitting flow in the line 55 and an annular groove 121 on the opposite side of the spool for permitting flow in channel 56. A spring 122 is interposed between the end of the valve in the valve casing for normally maintaining the valve in an outward or normal position. When this device is to be utilized a suitable member 123 is adjusted on the carrier in such a position that the tool will cut to a certain maximum depth after which the work table will be traversed relative to the tool without regard to the action of the tracer mechanism. In other words, when the carrier moves to such a depth as to retract the plunger 117 against the pressure of the spring 122 the spool portion 118 will move to the left as viewed in Figure 3 and disconnect port 119 from the port 120 and couple this port to channel 56 in which case the slide 27 will be held in a substantially fixed position while the work slide is traversed to such a position that the tracer will again pick up the pattern and the carrier will withdraw from contact with the depth limiting valve. After scanning the whole surface of the pattern with the tracer in this manner the depth limiting stop 123 is re-adjusted and the pattern again scanned to effect removal of the several layers, until at the last layer the tracer will scan the bottom of the pattern itself.

Attention is invited to the fact that when the distributor valve is shifted to the right as viewed in Figure 12 that the pressure port 32 is disconnected from ports 33 and 34 in which case there is no outlet for the fluid coming in through channel 44 and in this case the relief valve 39 is forced open to permit the escape of fluid to reservoir through the line 50. To prevent heating of the oil which usually results from discharge through a relief valve, the distributor valve may be elongated as shown in Figure 4 and provided with an intermediate spool 124, an additional pressure port 125, and an exhaust port 126. A channel 127 connects the exhaust port with one end 128 of the balancing valve 129. A plunger 130, reciprocably mounted in the valve, is of such length that when in a left hand position it closes a port 131 which leads to reservoir and opens port 132 forming part of channel 56 leading to cylinder 22. Upon movement of the distributor valve plunger to the right, port 33 will be closed and when the half way point is reached, port 125 will be coupled to port 126 thereby causing pressure to flow in channel 127 and causing the pressure in the end 128 of the valve 129 to rise above the pressure in the opposite end of the valve, which in turn will shift the plunger 130 to the right. This will tend to close port 132 building up pressure in line 56 equal to pressure in line 127 and this effects a division of flow in lines 127 and 56 in accordance with the fluid resistances of ports 126 and 32 regardless of work resistances similar to the other balancing valve. This will also tend to open port 131 permitting the pump pressure to by-pass to reservoir so long as the distributor valve remains undisturbed in its right hand extreme position. Since this permits a freer passage of oil to reservoir than through a relief valve it tends to prevent unnecessary heating of the oil.

In some instances it may be desirable to effect return of the carrier slide by hydraulic pressure rather than by the counterweight 90 as shown in Figure 3. In such case the opposite end of the cylinder 25 is connected by a channel 133 to the port 131 of the balancing valve 129. In addition a check valve 134 is connected by channels 127 and 133 in short circuiting relation to the end 128 of the balancing valve whereby during the admission of pressure thru channel 55 to one end of cylinder 125 the fluid in the other end will be forced out to reservoir through the check valve 134, ports 126 and 134 of the distributor valve and return channel 135. Upon shifting of the distributor valve to the right, pressure will be admitted to channel 127 thereby closing the check valve 134 and shifting the valve plunger 130 to the right which will admit pressure to channel 133 and the lower end of cylinder 25 and causing the fluid in the opposite end of the cylinder to be forced past the check valve 89 to reservoir in the usual manner as explained in connection with Figure 3.

There has thus been provided an improved hydraulically operated pattern controlled die-sinking machine which is composed of a relatively few number of parts comprising mainly a distributor valve for distributing pressure to a plurality of motors for effecting relative movement between the tool and work, and a tracer controlled mechanism for power positioning the distributor valve to cause relative movement between the tool and work in accordance with the movement imparted to the tracer by the pattern.

That which is claimed is:

1. In a die-sinking machine the combination of a carriage, a tracer and cutter mounted on the carriage, a work table adapted to support a work piece and a master, an hydraulic motor for effecting relative movement between the carriage and table in one direction, a second hydraulic motor for effecting relative movement between the carriage and table in a second direction, a source of fluid pressure, a distributing valve movable in one direction to couple pressure to one motor and in the other direction to disconnect pressure therefrom, each stroke of the valve also effecting delivery of a volume of fluid to the other motor, and means actuated by the tracer for reciprocating the valve to distribute volumes of fluid to the different motors in such proportion as to cause movement of the cutter relative to the work in accordance with movement of the tracer relative to the pattern.

2. In a die-sinking machine the combination of a carriage, a tracer and cutter mounted on the carriage, a work table adapted to support a work piece and a master, an hydraulic motor for effecting relative movement between the carriage and table in one direction, a second hydraulic motor for effecting relative movement between the carriage and table in a second direction, a source of fluid pressure, a distributing valve movable in one direction to couple pressure to one motor and in the other direction to disconnect pressure therefrom, each stroke of the valve also effecting delivery of a volume of fluid to the other motor, and means actuated by the tracer for reciprocating the valve to distribute volumes of fluid to the different motors in such proportion as to cause movement of the cutter relative to the work in accordance with movement of the tracer relative to the pattern, said means including opposed piston portions on opposite ends of the distributing valve, an auxiliary source of pressure and valve mechanism controlled by the tracer for alternately coupling the auxiliary pressure to the pistons to effect reciprocation of the distributing valve.

3. In a die-sinking machine having a carriage and a work table movable relative to one another in two directions, separate hydraulic motors for effecting the movement in each direction, a cutter mounted on the carriage, a work piece carried by the table, a tracer and pattern, one of which is mounted in the carriage and the other in the table, a main source of pressure, a distributing valve for determining the motor to be coupled to pressure, said valve having piston portions at opposite ends, an auxiliary source of pressure, a tracer controlled valve for determining coupling of said piston portions with the auxiliary source of pressure to thereby position said distributor valve, separate exhaust lines for permitting the piston actuating fluid to return to reservoir, and means in the exhaust lines in subsequent serial relation to the distributing valve to maintain an operating pressure therein.

4. In a die-sinking machine having a pair of slides movable in two directions relative to one another, separate hydraulic motors for effecting reciprocation in each direction, one of said slides carrying a tracer and cutter and the other slide a work piece and a pattern, a distributor valve for coupling one motor to pressure to effect a relative traversing movement between the work and cutter and to the other motor to effect a relative in and out feed movement to the tracer and cutter with respect to the pattern and work respectively, said distributing valve having a pressure port, distributing ports spaced on opposite sides thereof, channels respectively coupling the distributing ports to the separate motors, a plunger reciprocably mounted in the valve having two positions for alternately coupling the motors to pressure, and means controlled by the tracer upon contact with the pattern to determine the portion between the respective fluid volumes delivered to each motor by the distributor valve and thereby the direction of the resultant movement of one slide relative to the other.

5. In a die-sinking machine having a pair of slides movable in two directions relative to one another, separate hydraulic motors for effecting reciprocation in each direction, one of said slides carrying a tracer and cutter and the other slide a work piece and a pattern, a distributor valve for coupling one motor to pressure to effect a relative traversing movement between the work and cutter and to the other motor to effect a relative in and out feed movement to the tracer and cutter with respect to pattern and work respectively, said distributing valve having a pressure port, distributing ports spaced on opposite sides thereof, channels respectively coupling the last named ports to the separate motors, a plunger reciprocably mounted in the valve having different positions for coupling the motors to pressure, means controlled by the tracer to determine the proportion between the incremental volumes of fluid delivered to each motor by the distributor valve and thereby the direction of the resultant movement of one slide relative to the other, and means on the valve plunger when in a position to couple one motor to pressure, to couple the other motor to exhaust.

6. In a die-sinking machine having a work slide and a cutter slide, the combination of a pattern and tracer, one of which is mounted on the work slide and the other on the cutter slide, separate hydraulic motors for effecting reciprocation of the slides, a source of pressure, a distributor valve for coupling the pressure to said motors, hydraulically actuated mechanism controlled by said tracer for determining the position of said distributing valve, and means on the valve when in a position to couple the work slide motor to pressure, to couple the cutter slide motor to reservoir, and means to effect outfeed of the cutter slide when its motor is connected to reservoir.

7. In a die-sinking machine having a work slide and a cutter slide, the combination of a pattern and tracer, one of which is mounted on the work slide and the other mounted on the cutter slide, separate hydraulic motors for effecting reciprocation of the slides, a source of pressure, a distributing valve for coupling the pressure to said motors, hydraulically actuated mechanism controlled by said tracer for determining the position of said distributing valve, means on the valve when in a position to couple the work slide motor to pressure, to couple the cutter slide motor to reservoir, and means to effect outfeed of the cutter slide when its motor is connected to reservoir, said last named means including a weight operatively coupled to the slide.

8. In a die-sinking machine having a work slide and a cutter slide, the combination of a pattern and tracer, one of which is mounted on the work slide and the other on the cutter slide, separate hydraulic motors for effecting reciprocation of the slides, a source of pressure, a distributing valve for coupling the pressure to said motors, hydraulically actuated mechanism controlled by said tracer for determining the position of said distributing valve, means on the valve when in a position to couple the work slide motor to pressure, to couple the cutter slide motor to reservoir, and means to effect outfeed of the cutter slide when its motor is connected to reservoir, said last named means including an hydraulically actuated piston, and portions in the distributor valve for coupling pressure thereto.

9. In a die-sinking machine having a pair of slides movable in two directions relative to one another, separate hydraulic motors for effecting reciprocation in each direction, one of said slides carrying a tracer and cutter and the other slide a work piece and pattern, a source of pressure, a distributor valve for coupling one motor to pressure to effect a relative traversing movement between the work and cutter and to the other motor to effect a relative in and out feed movement to the tracer and cutter with respect to the pattern and work respectively, said distributing valve having a pressure port, distributing ports spaced on opposite sides of the pressure port, channels respectively coupling the last named ports to the separate motors, a plunger reciprocably mounted in the valve having different positions for coupling the motors to pressure, means controlled by the tracer upon contact with the pattern for proportioning the respective volumes delivered to each motor by the distributor valve and thereby the direction of the resultant movement of one slide relative to the other, and a balancing valve to maintain said proportion between the respective volumes delivered to the motors.

10. In a die-sinking machine having a pair of slides movable in two directions relative to one another, separate hydraulic motors for effecting reciprocation in each direction, one of said slides carrying a tracer and cutter and the other slide a work piece and a pattern, a source of pressure, a distributor valve for coupling one motor to pressure to effect a relative traversing movement between the work and cutter and to the other motor to effect a relative in and out feed movement to the tracer and cutter with respect to the pattern and work respectively, said distributing valve having a pressure port, distributing ports spaced on opposite sides of the pressure port, channels respectively coupling the ports to the separate motors, a plunger reciprocably mounted in the valve having different positions for coupling the motors to pressure, means controlled by the tracer upon contact with the pattern to determine the proportion between the respective volumes delivered to each motor by the distributor valve and thereby the direction of the resultant movement of one slide relative to the other, means on the valve plunger when in a position to couple one motor to pressure, to couple the other motor to exhaust, and a balancing valve to maintain the division of flow between the motors.

11. In a die-sinking machine having a work slide and a cutter slide, a pattern carried by the work slide, a tracer carried by the cutter slide, separate hydraulic motors for effecting reciprocation of the slides, a source of pressure, a distributing valve for coupling the pressure to said motors, hydraulically actuated mechanism controlled by said tracer for determining the position of said distributing valve, means on the valve when in a position to couple the work slide motor to pressure, to couple the cutter slide motor to reservoir, means to effect outfeed of the cutter slide when its motor is connected to reservoir, and a balancing valve between the distributor valve and the motors to maintain the division of flow between the motors.

12. In a die-sinking machine having a work slide and a cutter slide, a pattern carried by the work slide, a tracer carried by the cutter slide, separate hydraulic motors for effecting reciprocation of the slides, a source of pressure, a distributing valve for coupling the pressure to said motors, hydraulically actuated mechanism controlled by said tracer for determining the position of said distributing valve, means on the valve when in a position to couple the work slide motor to pressure, to couple the cutter slide motor to reservoir, means to effect outfeed of the cutter slide when its motor is connected to reservoir, said last named means including a weight, a balancing valve between the distributor valve and the motors to maintain the division of flow between the motors, and a bypass valve short circuiting one end of the balancing valve to permit free return of the fluid under action of said weight.

13. In a die-sinking machine having a pair of slides movable in two directions relative to one another, separate hydraulic motors for effecting reciprocation in each direction, one of said slides carrying a tracer and cutter and the other slide a work piece and a pattern, a distributor valve for coupling one motor to pressure to effect a relative traversing movement between the work and cutter and to the other motor to effect a relative in and out feed movement to the tracer and cutter with respect to the pattern and work respectively, said distributing valve having a pressure port, distributing ports spaced on opposite sides thereof, channels respectively coupling the last named ports to the separate motors, a plunger reciprocably mounted in the valve having different positions for coupling the motors to pressure, means controlled by the tracer upon contact with the pattern to determine the proportionate volumes to be delivered to the respective motors by the distributor valve and thereby the direction of the resultant movement of one slide relative to the other, a reversing valve in one branch line for reversing the direction of relative movement between the work and cutter, and automatic means for reversing said valve.

14. In a die-sinking machine having a pair of slides movable in two directions relative to one another, separate hydraulic motors for effecting reciprocation in each direction, one of said slides carrying a tracer and cutter and the other slide a work piece and a pattern, a distributor valve for coupling one motor to pressure to effect a relative traversing movement between the work and cutter and to the other motor to effect a relative in and out feed movement to the tracer and cutter with respect to the pattern and work respectively, said distributing valve having a pressure port, distributing ports spaced on opposite sides thereof, channels respectively coupling the last named ports to the separate motors, a plunger reciprocably mounted in the valve having two positions for coupling the motors to pressure, means controlled by the tracer upon contact with the pattern to determine the proportionate volumes to be delivered to the respective motors by the distributor valve and thereby the direction of the resultant movement of one slide relative to the other, a reversing valve in one branch line for reversing the direction of relative movement between the work and cutter, automatic means for reversing said valve, and dog operated means for effecting relative cross feed between the tool and work at the end of each traverse of the work.

15. In a pattern controlled die-sinking machine a pair of slides relatively movable with respect to one another in two directions, a pattern carried by one slide, a tracer carried by the other slide, a tool and a work piece mounted on the slides for relative movement to one another in two directions, a source of pressure, a plurality of hydraulic motors for effecting relative movement between the pattern and tracer, and tool and work, a distributor valve for determining the admission of pressure to said motors, tracer controlled hydraulically actuated mechanism for determining the position of the distributor valve and a feed rate control mechanism interposed between the source of pressure and said distributor valve for determining the rate of relative movement between the parts.

16. In a pattern controlled die-sinking machine a pair of slides relatively movable with respect to one another in two directions, a pattern carried by one slide, a tracer carried by the other slide, a tool and a work piece mounted on the slides for relative movement to one another in two directions, a source of pressure, a plurality of hydraulic motors for effecting relative movement between the pattern and tracer, and tool and work, a distributor valve for determining the admission of pressure to said motors, tracer controlled hydraulically actuated mechanism for determining the position of the distributor valve and a feed rate control mechanism interposed between the source of pressure and said distributor valve for determining the rate of relative movement between the parts, said rate control mechanism including a flow dividing valve, and means to by-pass a predetermined proportion of the valve in-flow to reservoir to determine said rate.

17. A die-sinking machine having a pair of relatively movable slides, a work piece and pattern carried by one slide, a tracer and cutter carried by the other slide, a first hydraulic motor for traversing one slide relative to the other, a second hydraulic motor for effecting infeed and outfeed of the tool relative to the work and of the tracer relative to the pattern, a source of pressure, a distributor valve for determining the motor to be coupled with pressure, means operated by the tracer when in contact with the pattern for determining the position of the distributor valve, and additional means for limiting the infeed movement of the tracer and cutter toward the pattern and work, whereby dies of greater depth than the cutting capacity of the tool may be formed with the use of a single pattern.

18. A die-sinking machine having a pair of relatively movable slides, a work piece and pattern carried by one slide, a tracer and cutter carried by the other slide, a first hydraulic motor for traversing one slide relative to the other, a second hydraulic motor for effecting infeed and outfeed of the tool relative to the work and of the tracer relative to the pattern, a source of pressure, a distributor valve for determining the motor to be coupled with pressure, means operated by the tracer when in contact with the pattern for determining the position of the distributor valve, and additional means for limiting the infeed movement of the tracer and cutter toward the pattern and work whereby dies of greater depth than the cutting capacity of the tool may be formed with the use of a single pattern, said means including a depth limiting valve interposed in the channels extending from the distributor valve to the hydraulic motors.

19. A die-sinking machine having a tracer and cutter, a work slide for supporting a work piece and pattern in adjacent relation to the tracer and tool, separate hydraulic motors for effecting traversing of the work, and in and out feeding of the tool relative to the work, a source of pressure, a distributor valve for coupling the pressure to said motors, hydraulically actuated mechanism controlled by the tracer for effecting reciprocation of the distributor valve, branch lines extending from the valve to each motor, a plunger reciprocably mounted in the valve, said plunger having portions effective upon movement in one direction to open and close one line to thereby deliver a volume of fluid to the connected motor and simultaneously close the other line, and means to bypass the pump to reservoir during momentary closure of said line.

20. A die-sinking machine having a tracer and cutter, a work slide for supporting a work piece and pattern in adjacent relation to the tracer and tool, separate hydraulic motors for effecting traversing of the work, and in and out feeding of the tool relative to the work, a source of pressure, a distributor valve for coupling the pressure to said motors, hydraulically actuated mechanism controlled by the tracer for effecting reciprocation of the distributor valve, branch lines extending from the valve to each motor, a plunger reciprocably mounted in the valve, said plunger having portions effective upon movement in one direction to open and close one line to thereby deliver a volume of fluid to the connected motor and simultaneously close the other line, and means to by-pass the pump to reservoir during momentary closure of said line, said last-named means including an automatically operated shunt valve forming part of the distributor valve plunger.

21. In a die-sinking machine the combination of a carriage, a tracer and cutter mounted on the carriage, a work table adapted to support a work piece and a master, a fluid operable motor for effecting relative movement between the carriage and table in one direction, a second fluid operable motor for effecting relative movement between the carriage and table in a second direction, each motor having a pressure receiving port, a source of fluid pressure, a distributor valve movable to one extreme position for coupling said pressure source to the port of one motor, and to the other extreme position for disconnecting the pressure from said port, each movement of the valve from one position to the other connecting and disconnecting the port of the other motor with pressure to effect an intermittent feed between the carriage and table in one direction, and means actuated by the tracer for determining the time interval between reciprocations of the valve and thereby the directional movement of the cutter relative to the work.

22. In a die-sinking machine the combination of a carriage, a tracer and cutter mounted on the carriage, a work table adapted to support a work piece and a master, a first hydraulic motor for effecting relative movement between the carriage and table in one direction, a second hydraulic motor for effecting relative movement between the carriage and table in a second direction, each of said motors having intake ports, a source of fluid pressure, a distributor valve having a first position for connecting the port of one motor to pressure and a second position for connecting said port to exhaust, means actuated by the tracer for shifting the valve from one position to the other to cause movement of the cutter toward and from the work, and means operable by the valve in shifting from one position to the other to effect a momentary connection of the source of pressure with the port of the other motor and thereby an intermittent feed of the work with respect to the cutter.

23. In a die-sinking machine having a carriage and a work table movable relative to one another in transverse paths, a first hydraulic motor for effecting movement in one path, a second hydraulic motor for effecting movement in one direction along the second path, a counterweight for effecting return movement along the second path, a cutter mounted on the carriage, a work piece carried by the table, a tracer and pattern, one of which is mounted on the carriage and the other on the table, a source of pressure, a distributor valve for coupling said pressure source to the second motor, said valve being shiftable to a second position for releasing the pressure from said second motor whereby the counterweight will become operative, said distributor valve having piston portions on opposite ends thereof, a tracer controlled valve for determining the coupling of pressure to said piston portions and thereby directional shifting of the valve, and means on the valve for coupling the pressure to the first motor at an intermediate point in its shifting movement to effect intermittent feeding movements along one of said paths.

24. In a die-sinking machine having a pair of slides relatively movable along two transverse paths, one of said slides carrying a tracer and cutter and the other slide a work piece and a pattern, a first hydraulic motor for effecting movement of the tracer and cutter toward and from the pattern and work respectively, a second motor for effecting intermittent feed between the tracer and cutter and the pattern and work in the other path, a source of pressure, a distributor valve having one position for coupling the first motor to pressure to effect movement of the tracer and cutter toward the pattern and work piece and a second position connecting the motor to exhaust, additional means for moving the tracer and cutter away from the pattern and work piece during said exhaust connection, tracer controlled means including hydraulically actuable mechanism for shifting the valve from one position to the other, and means operable by the valve during its shifting movement to effect an intermittent delivery of fluid to the second motor and thereby a relative feed between the slides in said other path.

25. In a die-sinking machine having a pair of slides relatively movable along a first path and a second path, said paths lying transversely to one another, a first and second hydraulic motor for effecting movement in the respective paths, one of said slides carrying a tracer and cutter and the other slide a work piece and pattern, a distributor valve having a pressure port, a pair of delivery ports, channels respectively coupling the ports to said motors, a plunger reciprocably mounted in the valve having first and second positions for coupling one delivery port to pressure and to exhaust respectively, said plunger also coupling and uncoupling the other delivery port to and from the pressure port during shifting of the valve in either direction to effect intermittent feed between the cutter and work, and means controlled by the tracer in contact with the pattern to determine the length of transverse movement relative to the length of feed movement and thereby the direction of resultant movement of one slide relative to the other.

26. In a die-sinking machine having a carriage and a work table, a tracer and cutter mounted on the carriage, and a pattern and work carried by the table, said table being movable along one path to effect a feeding movement of the work relative to the cutter, and said carriage being movable in a transverse direction to effect movement of the tracer and cutter toward and from the pattern and work, of separate hydraulic motors for effecting movement of the slides in their respective paths, a source of fluid pressure, a distributor valve for determining fluid operation of the motors, said valve having a pressure port connected to said source, a pair of delivery ports and an exhaust port, channels respectively coupling the delivery ports to the individual motors, a plunger reciprocably mounted in the valve, said plunger having a first and second position for alternately coupling one delivery port to the pressure port and exhaust respectively to cause infeeding or outfeeding of the tracer and cutter, hydraulically actuable means for shifting said valve, means operable by the valve during a single shifting movement for connecting the other delivery port to the pressure port for simultaneously accelerating the traversing motor during deceleration of the infeed movement and sequentially decelerating the traverse motor while accelerating the other motor on its outfeed movement, and a tracer mechanism for controlling said hydraulic shifting means.

27. In a die-sinking machine having a work slide and a cutter slide movable along transverse paths, the combination of a pattern and tracer mounted on the respective slides, separate hydraulic motors for moving the respective slides, a source of pressure, a distributing valve having a pressure port connected to said source, a pair of delivery ports, channels connecting the respective delivery ports to said motors, said valve also having an exhaust port, hydraulically actuated mechanism controlled by said tracer for shifting the valve from a first position, in which the pressure port is connected to one of said delivery ports, to a second position in which said delivery port is disconnected from pressure and connected to said exhaust port, and means on the valve to effect a momentary connection between the pressure port and the other delivery port to effect an intermittent feed movement to one of said slides during a momentary stop and reverse of the first slide.

28. In a die-sinking machine having a work slide and a cutter slide movable transversely to one another the combination of a pattern and tracer, one of which is mounted on the work slide and the other on the cutter slide, separate hydraulic motors for effecting reciprocation of the slide, a source of pressure, said valve having a pressure port connected to said source, a pair of delivery ports, a first channel connecting one port to one of said motors, a pair of parallel channels extending from the other port to the remaining motor, a check valve in one of said parallel lines, a throttle valve in the other parallel line whereby upon the admission of pressure to said parallel lines the throttle valve will be automatically opened to cause movement of the motor in one direction and upon disconnection of pressure the throttle valve will close, and means to connect said lines to reservoir whereby the fluid in said motor will escape through said check valve to permit return movement of the connected slide.

29. In a die-sinking machine having a work slide and a cutter slide, the combination of a pattern and tracer, one of which is mounted on the work slide and the other mounted on the cutter slide, separate hydraulic cylinders having contained pistons for effecting reciprocation of the slides, one of said cylinders having ports at opposite ends thereof a source of pressure, a distributing valve having an intake port connected to said source, a first delivery port connected to the work slide cylinder and second and third delivery ports, a pair of parallel channels coupling the second delivery port to the first port of the cutter slide cylinder, a second pair of parallel channels connecting the third delivery port to the second port of the cutter slide cylinder, a check valve in one line of each of said pair of parallel channels and a throttle valve in the remaining line of each pair of channels, said throttle valves automatically opening upon admission of pressure to the respective parallel lines and closing upon disconnection of pressure therefrom, closing of the throttle valves causing opening of the respective check valves to permit a return flow to reservoir, mechanism controlled by the tracer for shifting the distributing valve to a first position for connecting pressure to one pair of parallel lines and to a second position for connecting pressure to the other pair of parallel lines to cause in and out movement of the tracer and cutter relative to the pattern and work, shifting of said valve from one position to the other effecting a momentary connection to the first delivery port and thereby an intermittent feed of the work slide relative to the cutter slide.

30. In a die-sinking machine having a pair of slides movable in two transverse paths, separate hydraulic motors for effecting movement along the respective paths, one of said slides carrying a tracer and cutter, and the other slide a work piece and pattern, a distributor valve having a pressure port, a first delivery port, channel means connecting the first delivery port to one motor, said channel means including a reversing valve for determining the direction of movement of said motor and thereby the direction of relative feed between the work and cutter, a second delivery port in the distributor valve coupled to the other motor, a plunger reciprocably mounted in the valve having different positions for coupling the respective motors to pressure, means controlled by the tracer upon contact with the pattern to determine the proportionate volumes to be delivered to the respective motors, and means for automatically shifting said reversing valve.

31. In a die-sinking machine the combination of a carriage, a tracer and cutter mounted on the carriage, a work table adapted to support a work piece and a master, separate fluid operable devices for effecting movement of the carriage and table, a source of fluid pressure, valve means for controlling the coupling of pressure to said devices, and means actuated by the tracer for determining the position of said valve means including a pair of channels, a valve coupled to the source of pressure for dividing the flow therefrom between said channels, said channels being operatively connected to the valve means whereby a reversal in the pressure differential in said channels will cause shifting of the valve means, and means operatively connecting the flow dividing valve to the tracer whereby movement of the tracer from one extreme position to the other will complementarily change the pressure in said channels and thereby opposite shifting of said valve means.

32. In a die-sinking machine having a work slide and a cutter slide the combination of a pattern and tracer, one of which is mounted on the work slide and the other mounted on the cutter slide, separate hydraulic motors for effecting reciprocation of the slides, a source of pressure, a distributor valve movable to different positions for determining the flow of pressure to said motors, means controlled by the tracer for determining the position of the distributor valve including a pair of channels, each channel having a pair of serially arranged fluid resistances therein, means coupling the opposite ends of the distributor valve respectively to said channels intermediate the resistances therein, and means operatively connected to the tracer for complementarily varying the first fluid resistances in each channel to thereby alternately increase or decrease the pressure on one end of the distributor valve with respect to the pressure on the opposite end to effect reciprocation thereof.

33. In a die-sinking machine having a work slide and a cutter slide the combination of a pattern and tracer, one of which is mounted on the work slide and the other on the cutter slide, separate hydraulic motors for effecting reciprocation of the slides, a source of pressure, a distributing valve variously movable for determining the coupling of pressure to said motors, and means controlled by the tracer for determining the position of said valve to cause movement of the cutter in a path corresponding to the pattern, fluid pressure operable means acting on opposite ends of the valve for shifting the same, a delivery channel extending to each of said means, a flow dividing valve operatively connected to the tracer whereby movement of the tracer in one direction will shift the valve to create a higher pressure in one channel over the other, and resiliently operable means effective upon movement of the tracer in the opposite direction to shift said valve to cause a reversal in the respective pressures in said channels and thereby a shifting of the distributor valve.

34. A tracer control mechanism for an hydraulically operated profiling machine having a pair of motors for effecting relative movement between a cutter and work in accordance with a pattern including a universally movable tracer arm having a portion for contacting a pat'ern, a valve mechanism for determining the flow to said motors, a pair of fluid operable pistons operatively connected to the valve for determining the position thereof, a flow dividing valve having a plunger operatively connected to the tracer for controlling the admission of pressure to said pistons, means normally maintaining the plunger in a position for causing a pressure differential on said pistons and for maintaining the tracer arm undeflected, and means to longitudinally adjust said valve to determine the amount of said pressure differential, said valve being shiftable by a predetermined amount of tracer deflection to reverse the pressure differential in said channels.

35. A tracer control mechanism for an hydraulically operated profiling machine having a pair of motors for effecting relative movement between a cutter and work in accordance with a pattern including a housing, a tracer arm having a flange on one end supported in said housing and a pattern contacting portion on the other end, an axially shiftable connecting rod mounted in the housing in contact with said flange, a valve mechanism for determining the flow to said motors including a pair of fluid operable valve shifting devices, an additional valve having a pressure port and delivery ports on opposite sides thereof connected to the respective devices, said last named valve having reciprocable pistons operatively connected to the rod, resilient means normally urging the piston and thereby the rod and tracer in a pattern contacting direction, an adjustable stop carried by the housing and engaging said flange for limiting movement of the tracer and thereby determining the position of said piston relative to the valve ports whereby one of said devices will be actuated to effect contact between the tracer and pattern and the other device operated after predetermined deflection of the tracer by the pattern to cause a separating movement between the tracer and pattern.

36. In a device of the class described having an adjustable distributor valve for determining the direction of relative movement between a cutter and work in accordance with movement of a tracer relative to a pattern, the combination of tracer mechanism for controlling said valve including a tracer arm mounted for axial or lateral movement by a pattern, hydraulically actuated means for adjusting said valve having a single control means responsive to either direction of movement of the tracer arm for effecting operation of said hydraulically actuated means and thereby adjustment of said valve.

37. In a device of the class described in which an adjustable distributor valve is utilized for controlling the direction of relative movement between a cutter and work in accordance with a pattern, the combination of opposed pressure operable devices for positioning the valve, and a tracer mechanism for controlling the opposing pressures on said devices including a valve body having a bore and a reciprocable piston contained therein, an annular groove formed in the bore and connected to a source of pressure, additional annular grooves spaced on opposite sides of the pressure port and connected to said devices, a tracer arm connected to said piston, said piston being slightly smaller than the width of said pressure port whereby an equal pressure drop will occur between the pressure port and the delivery ports when the valve is in a central position and a pressure differential will be created between the delivery ports when the piston is moved to a non-central position.

38. In a device of the class described having a plurality of fluid operable pistons for effecting relative movement between a cutter and work along a non-uniform path and in correspondence to a pattern, the combination of an hydraulic control circuit including a first pump, a rate control device and a distributor valve serially connected in the order named, delivery channels extending from the distributor valve to said pistons, fluid operable means for shifting the distributor valve, a second pump for supplying fluid to said means, and a tracer controlled valve coupling the second pump to said means whereby the distributor valve will be responsive to tracer movement in commanding operation of said pistons.

39. In a device of the class described having a plurality of fluid operable pistons for effecting relative movement between a cutter and work along a non-uniform path and in correspondence to a pattern, the combination of an hydraulic control circuit including a first pump, a rate control device and a distributor valve serially connected in the order named, delivery channels extending from the distributor valve to said pistons, fluid operable means for shifting the distributor valve, a second pump for supercharging the first pump, and a tracer controlled valve having a pressure port connected intermediate the first and second pumps for controlling actuation of said means whereby the distributor valve will be responsive to tracer movement in commanding operation of said pistons.

40. In a device of the class described having a plurality of fluid operable pistons for effecting relative movement between a cutter and work along a non-uniform path and in correspondence to a pattern, the combination of an hydraulic control circuit including a first pump, a rate control device and a distributor valve serially connected in the order named, delivery channels extending from the distributor valve to said pistons, and a tracer controlled valve having a pressure port connected to said pump for determining the flow of fluid pressure to said means whereby the distributor valve will be responsive to tracer movement in commanding operation of said pistons.

41. In a device of the class described the combination with a distributor valve having a first position for causing a relative approach between a cutter and work and between a tracer and pattern, and a second position for causing retraction of the parts, opposed pistons for shifting the valve between positions, a tracer controlled valve having a pressure port, delivery ports spaced on opposite sides thereof and connected to the respective pistons, said last named valve having a piston connected for movement by the tracer relative to the pressure port, said last named piston being of such size relative to the port opening that slight movement to one side of a central port position will create a pressure differential on the opposed pistons, and a shifting of the distributor valve to one extreme position to cause a relative approach between cutter and work and a slight movement to the other side of a central position will inverse the pressure differential and cause shifting of the distributor valve to its other extreme position causing a retracting movement between cutter and work whereby the valve will be continuously reciprocated during a machining operation to maintain contact between the tracer and pattern and between the cutter and work.

42. In a pattern controlled machine tool having a pair of transversely movable slides for effecting relative movement between a cutter and work in a path corresponding to a master, a piston and cylinder for effecting movement of one slide in opposite directions, a piston coupled to the other slide for effecting movement in one direction and a gravity actuated mechanism for returning the slide, a distributor valve having a pressure port, a source of pressure connected thereto, a pair of delivery ports connected to the respective pistons, means for shifting the valve to one extreme position to connect the pressure port to the second named piston, means to shift the valve to its other extreme position to close the pressure port and connect said second named piston to reservoir whereby the gravity actuated mechanism will effect return movement of the connected slide and additional means in the valve for by-passing the incoming fluid freely to reservoir.

43. A die-sinking machine comprising a bed having horizontal guide ways, a work table reciprocably mounted in said guide ways, a column having vertical guide ways, a vertically movable slide mounted on the column ways, a screw and nut, one of which is fixed against rotation for moving said slide, a horizontally movable tool support mounted on said vertical slide for movement in planes at right angles to the direction of table movement, a tool spindle journaled in the tool support, a prime mover carried by the support and operatively connected for rotation of the spindle, a first fluid operable piston for moving the tool support, a second fluid operable piston for moving the table, a tracer carried by the tool support for engagement with a pattern carried by the work support, and a fluid circuit controlled by the tracer for governing fluid actuation of said pistons whereby the tool will be moved to and from the work, and a work table will be moved laterally of the tool axis.

44. A die-sinking machine comprising a bed having horizontal guide ways, a work table reciprocably mounted in said guide ways, a column having vertical guide ways, a vertically movable slide mounted on the column ways, a screw and nut, one of which is fixed against rotation for moving said slide, a horizontally movable tool support mounted on said vertical slide for movement in planes at right angles to the direction of table movement, a tool spindle journaled in the tool support, a prime mover carried by the support and operatively connected for rotation of the spindle, a first fluid operable piston for moving the tool support, a second fluid operable piston for moving the table, a tracer carried by the tool support for engagement with a pattern carried by the work support, a fluid circuit controlled by the tracer for governing fluid actuation of said pistons whereby the tool will be moved to and from the work, and a work table will be moved laterally of the tool axis, and automatic means operable at the end of a table stroke to effect relative rotation between said screw and nut to index the vertically movable slide preparatory to a return pass of the work past the tool.

BERNARD SASSEN.